(12) United States Patent
Hicks et al.

(10) Patent No.: US 8,517,532 B1
(45) Date of Patent: Aug. 27, 2013

(54) EYEWEAR WITH REVERSIBLE FOLDING TEMPLES

(76) Inventors: Robert L. Hicks, Orange, CA (US); John Duval, Long Beach, CA (US)

( * ) Notice: Subject to any disclaimer, the term of this patent is extended or adjusted under 35 U.S.C. 154(b) by 336 days.

(21) Appl. No.: 12/852,982

(22) Filed: Aug. 9, 2010

Related U.S. Application Data

(63) Continuation-in-part of application No. 12/569,592, filed on Sep. 29, 2009, now abandoned.

(60) Provisional application No. 61/194,890, filed on Sep. 29, 2008.

(51) Int. Cl.
   *G02C 5/22* (2006.01)
   *G02C 5/00* (2006.01)

(52) U.S. Cl.
   CPC .............. *G02C 5/2209* (2013.01); *G02C 5/006* (2013.01)
   USPC ............................... 351/153; 351/63; 351/121

(58) Field of Classification Search
   CPC .............................. G02C 5/2209; G02C 5/006
   USPC .................... 351/41, 63, 111, 119, 121, 153; 16/228
   See application file for complete search history.

(56) References Cited

U.S. PATENT DOCUMENTS

| | | | |
|---|---|---|---|
| 3,476,466 A | 11/1969 | Hopkins | |
| 3,533,687 A | 10/1970 | Herzig | |
| 5,596,789 A | 1/1997 | Simioni | |
| 5,638,146 A | 6/1997 | Nannini | |
| 5,638,147 A | 6/1997 | Wang-Lee | |
| 5,745,952 A | 5/1998 | Baragar et al. | |
| 5,896,186 A | 4/1999 | Roban | |
| 5,980,038 A * | 11/1999 | Chen | 351/120 |
| 6,238,048 B1 | 5/2001 | Fukuoka | |
| 6,530,660 B1 | 3/2003 | Chao et al. | |
| D473,584 S | 4/2003 | Benavides et al. | |
| 6,618,901 B1 | 9/2003 | Wang-Lee | |
| 6,755,523 B1 * | 6/2004 | Wiedner | 351/63 |
| 6,786,594 B1 | 9/2004 | Lucas et al. | |
| 7,070,273 B2 | 7/2006 | Benavides et al. | |
| 7,222,957 B1 | 5/2007 | Allred | |
| RE40,108 E | 2/2008 | Kuo | |
| 7,380,935 B2 | 6/2008 | Ifergan | |

FOREIGN PATENT DOCUMENTS

FR   2815728   *   4/2002

* cited by examiner

*Primary Examiner* — Huy K Mai

(74) *Attorney, Agent, or Firm* — The Eclipse Group LLP

(57) ABSTRACT

A pair of eyeglasses is provided that includes a frame having hinge joints coupled to opposite ends of the frame and a pair of temple members pivotally coupled to the hinge joints. When in use, the temple members may be pivoted about a substantially horizontal axis of rotation between an extended or open position where the temple members are space apart and parallel to one other, and a folded or closed position where one member is folded over the other in an area behind the eyeglass frame.

19 Claims, 13 Drawing Sheets

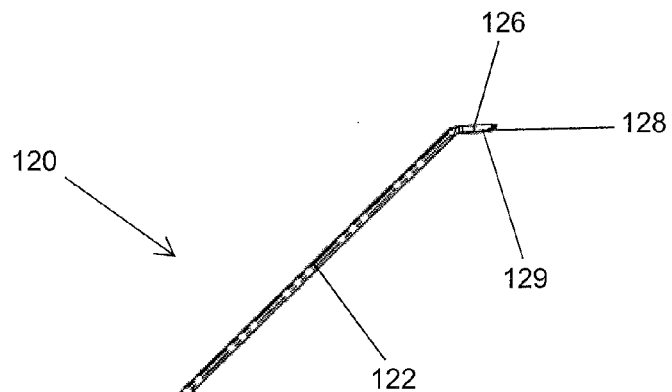
FIG. 3A
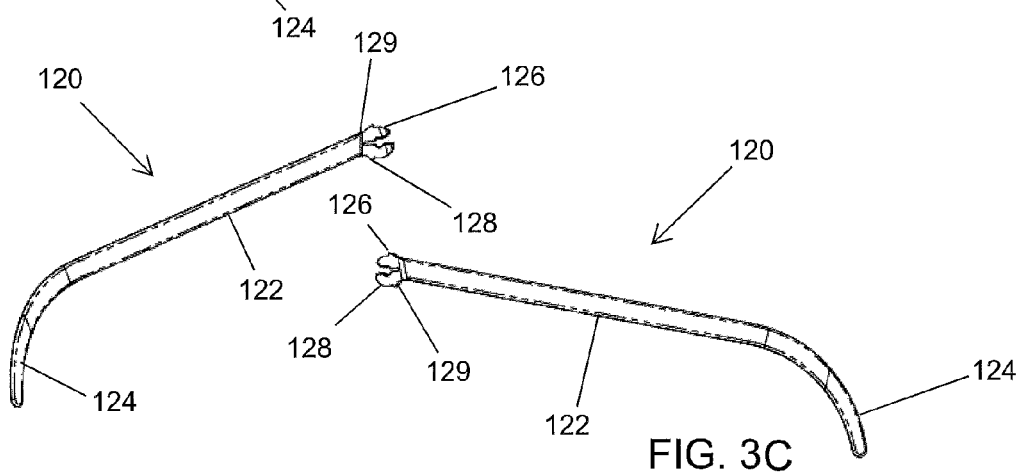
FIG. 3B
FIG. 3C
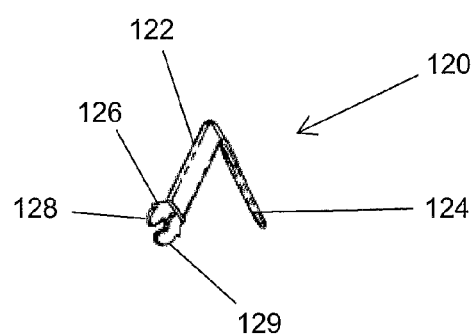
FIG. 3D

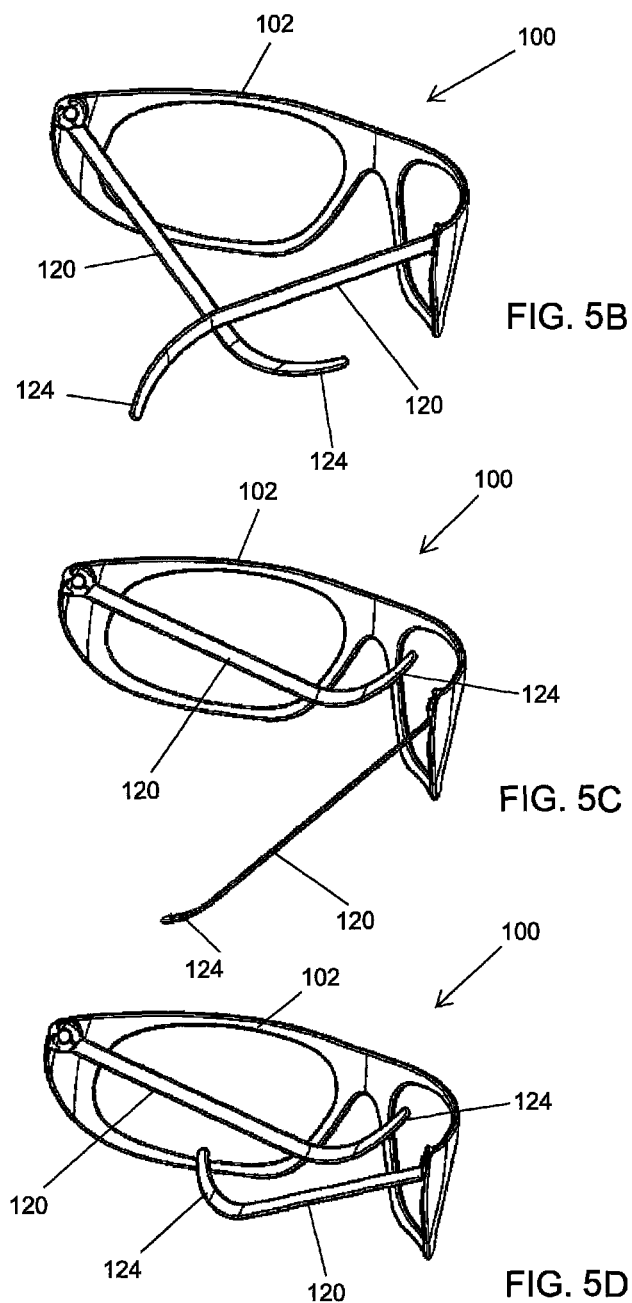

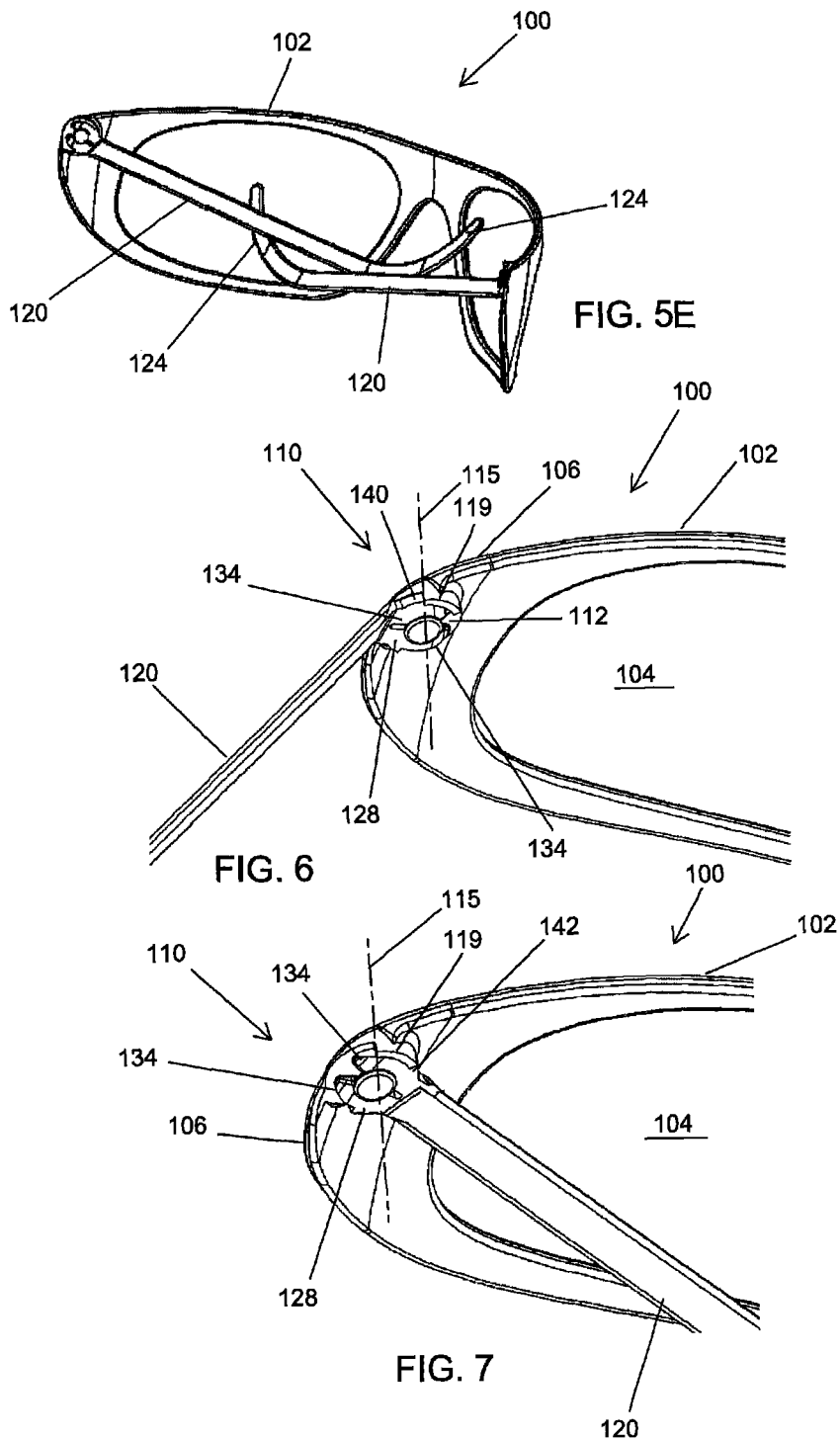

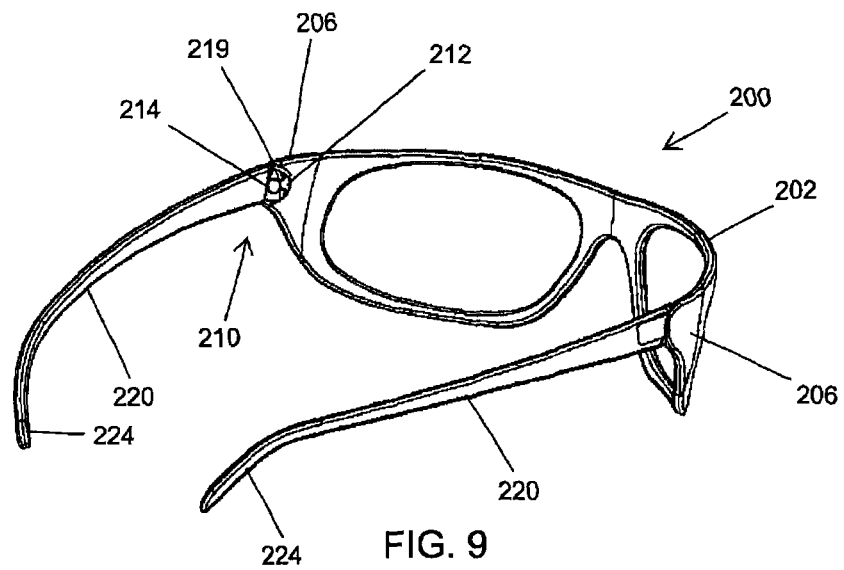
FIG. 9
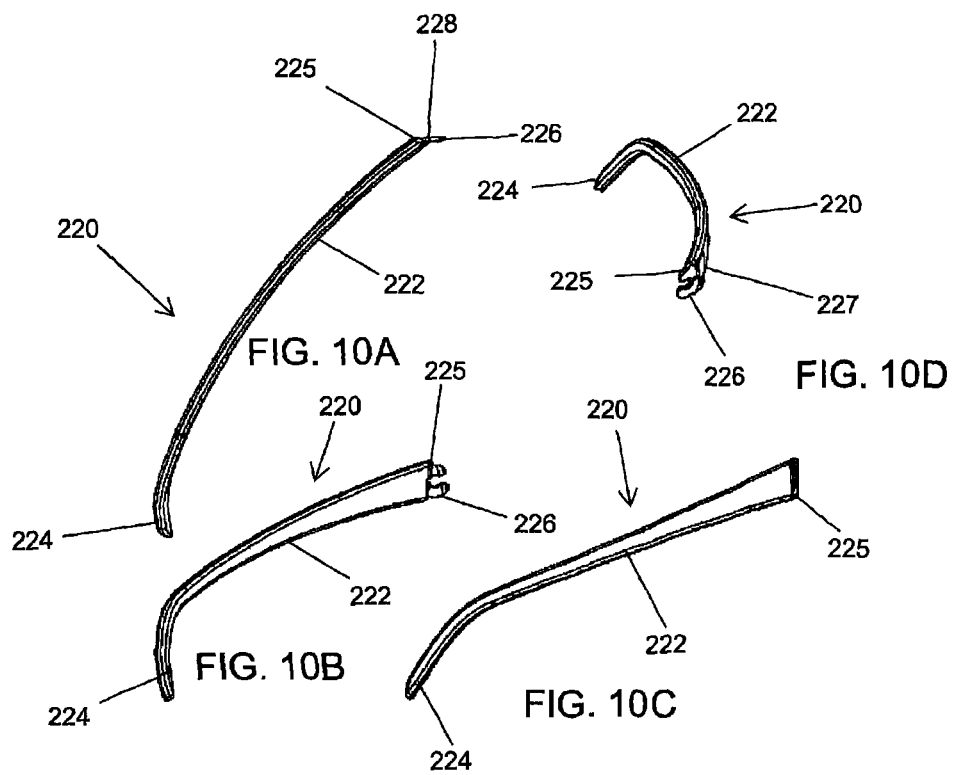
FIG. 10A
FIG. 10B
FIG. 10C
FIG. 10D

EYEWEAR WITH REVERSIBLE FOLDING TEMPLES

RELATED CASE

This application is a continuation-in-part to U.S. patent application Ser. No. 12/569,592 filed on Sep. 29, 2009 and titled FOLDABLE EYEGLASS CASE, which claims priority to U.S. Provisional Patent Application Ser. No. 61/194,890, filed on Sep. 29, 2008 and titled FOLDABLE EYEGLASS CASE, which applications are incorporated in their entirety by reference in this application.

BACKGROUND OF THE INVENTION

1. Field of the Invention

The invention relates to eyeglasses, and in particular, eyeglasses having reversible folding temple members.

2. Related Art

Eyeglasses have been ubiquitous for centuries. Many types of eyeglasses exist, including corrective or prescription glasses, safety and UV protective glasses, sunglasses, reading glasses, 3D glasses, and the like. Eyeglasses generally comprise a frame bearing a set of lenses, a pair of arm members, commonly referred to as temples, designed to hook over the wearer's ears, and a corresponding pair of hinges that connect the temples to the frame. The hinges allow the temples to fold inward in a closing motion from an extended operative or open position to a folded non-operative or closed position, or alternatively, swing outward in an opening motion from the closed position to the open position. In the open position, the temples are approximately parallel to one another to engage the ears of the user when the eyeglasses are being worn. In the closed position, the temples are folded, one over the other, so that they generally overlie the rear faces of the eyeglass lenses.

Generally, the hinges are mounted to the eyeglass frame at opposite ends of the frame and include a screw that secures the hinge to one end of the temples. The screw defines an axis of rotation that extends substantially vertically when the eyeglasses are being worn. The axis of rotation is generally parallel to the plane of the lenses. As the temples of the eyeglasses are repeatedly opened and closed during use, the hinge screws have a tendency to loosen and or fall out completely and, too often, the hinge screws are lost. In addition, the temples of traditional eyeglasses often break at the hinges if the temples are overextended (i.e., pivoted outward beyond 90°) or the eyeglasses are dropped or crushed in an eyeglass case during storage.

Prior attempts have been made to address the drawbacks of conventional eyeglasses discussed above. These attempts include the eyeglass hinge assemblies disclosed in U.S. Pat. Nos. 5,402,552, 6,530,660, and 6,768,594. However, these prior attempts do not adequately solve the problems discussed above.

Thus, a need exists for an eyeglass assembly that effectively solves the problems associated with conventional eyeglass hinge assemblies and, in addition, enables the eyeglasses to be more compact when folded and even allows the temple members to be easily detached from the eyeglass frame during storage or repair.

SUMMARY

A pair of eyeglasses is provided that includes a frame having hinge joints coupled to opposite ends of the frame and a pair of temple members pivotally coupled to the hinge joints. When in use, the temple members may be pivoted about a substantially horizontal axis of rotation between an extended or open position where the temple members are space apart and parallel to one another, and a folded or closed position where one member is folded over the other in an area behind the eyeglass frame.

Each hinge joint includes a substantially vertical bearing surface coupled to an end of the eyeglass frame and a pivot pin that extends substantially perpendicularly from the center of the bearing surface. The pivot pin defines a substantially horizontal axis of rotation about which the temple members rotate. The pivot pin is configured to be received by a clamping member coupled to one end of a temple member.

The temple members each include an elongated body, a formed tip on one end of the body, and a clamping member coupled to an opposite end of the body. The formed tip is adapted to fit around the user's ear. The clamping member is adapted to be secured about the pivot pin by a snap or a friction fit. In this way, the temple members may pivot about the pivot pin and be easily detached from and re-attached to the pivot pin. A stop coupled to the hinge joint limits the rotational movement of the temple members between the open and closed positions.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIGS. 3A through 3D are plan views of the front and sides of the temple members of the eyeglasses of FIG. 1 illustrating the angled relation between the clamping

FIGS. 5A through 5E are rear perspective views of the eyeglasses of FIG. 1 illustrating the inward rotation of the temple members from the open position to the closed position.

FIG. 6 is a perspective view of a hinge joint of the eyeglasses of FIG. 1 illustrating the temple member in the open position.

FIG. 7 is a perspective view of a hinge joint of the eyeglasses of FIG. 1 illustrating the temple member in the closed position.

FIG. 9 is a rear perspective view of another example of an implementation of a pair of eyeglasses of the invention.

FIGS. 10A through 10D are plan views of the front and sides of the temple members of the eyeglasses of FIG. 9 illustrating the angled relation between the clamping member and arm.

DETAILED DESCRIPTION

Figure 1:
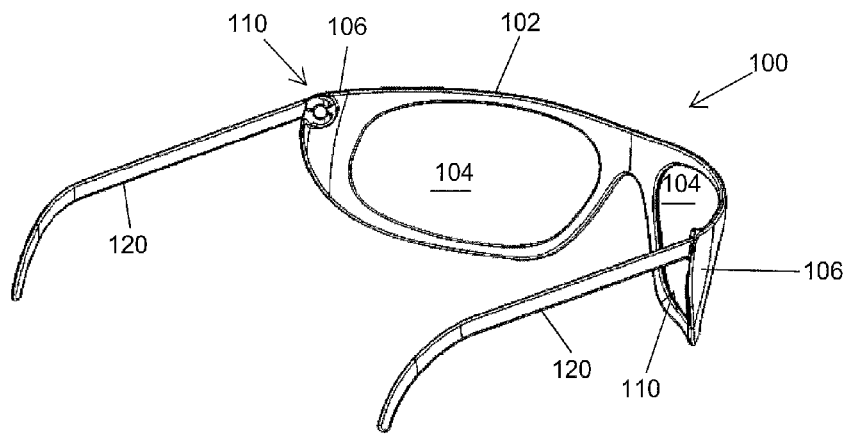
FIG. 1 is a rear perspective view of one example of an implementation of a pair of eyeglasses of the invention illustrating the eyeglasses in the open position.

As illustrated in the attached FIGS. 1-20, a pair of eyeglasses is provided having temples that pivot about a hinge joint from an open position, when the eyeglasses are worn, to a closed or collapsed position, when the eyeglasses are stored. The eyeglasses are designed to be compact, collapsible, and lightweight. For purposes of this application, sunglasses are considered a type of eyeglass.

FIGS. 1-8 illustrate one example of an implementation of the invention. In this example, the eyeglasses 100 include an eyeglass frame 102 having a pair of lenses 104, a pair of hinge joints 110 coupled to opposite ends 106 of the eyeglass frame 102, and a pair of temple members 120 coupled to the pivots 110. The eyeglass frame 102, hinge joints 110, and temple members 120 may generally be constructed from the same material. For example, the eyeglass frame, hinge joints, and temple members may each be constructed of plastic such as cellulose acetate, fiberglass, composites, metal such as monel, titanium, aluminum, flexon, beryllium, silver, gold, and stainless steel, or any other suitable material. In the implementation of the invention illustrated in FIGS. 1-8, the eyeglass frame 102, hinge joints 110, and temple members 120 are each constructed of stainless steel.

Alternatively, the eyeglass frame, hinge joints, and temple members may be constructed from different material. For example, the eyeglass frame and temple members may be constructed of plastic, and the hinge joints may be metal.

The eyeglass frame 102 may be a curved, unitary member conveniently molded or otherwise formed from various conventional eyewear frame plastics, metals, or a variety of other materials. However, in this particular implementation, the eyeglass frame 102 may be constructed from stainless steel. As illustrated in FIG. 2B, the curved geometry or contour of the eyeglass frame 102 may define an interior region 108 behind the eyeglass frame where the temple members 120 (FIG. 1) may be stowed in the closed position in close proximity to the eyeglass lenses 104 (FIG. 2A).

The lenses 104 may take any of a number of configurations and may be formed of thermoformed sheet plastic, injection molded plastic such as polycarbonate, or various other materials, as determined by the intended use of the lens. The lenses 104 may be injection molded and mounted in the frame 102. The lenses 104 may be of any appropriate geometry such as for example, circular, elliptic, octagon, square, rectangular, or any other suitable shape.

Figure 2A:
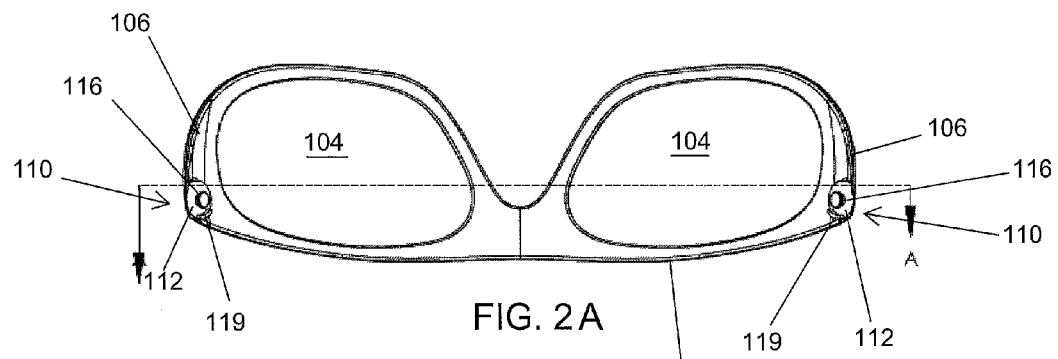
FIG. 2A is a rear plan view of the eyeglasses of FIG. 1 illustrating the eyeglass frame without the temple members.
Figure 2B:
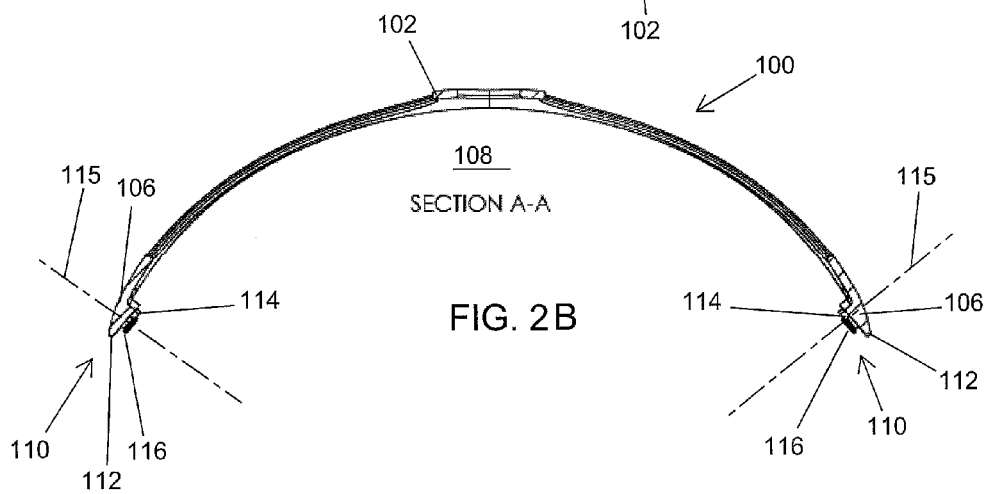
FIG. 2B is a cross-section of the eyeglass frame of FIG. 2A taken along section line A-A.

Turning now to FIGS. 2A and 2B, each hinge joint 110 is coupled to an end piece 106 of the eyeglass frame 102 and may include a substantially vertical circular bearing surface 112 that projects outward from the back side of the end piece 106, a cylindrical pivot pin 114 extending perpendicularly from the center of the bearing surface 112 along a substantially horizontal axis 115, and a flattened circular pin head 116 coupled to the top of the pivot pin 114. In this example, the pivot pin 114 has a defined height to maintain the pin head 116 in spaced apart relation from the bearing surface 112. The diametrical dimension of the pin head 116 may be larger than the diameter of the pin body such that an annular sleeve (see reference 319 in FIG. 17) for receiving an end of the temple members 120 is formed between the bearing surface 112 and the pin head 116, about the pivot pin 114.

As shown, each member of the hinge joints 110 may be made of stainless steel and integrally formed with the frame 102. In other implementations, the bearing surface 112 may be integrally formed with the frame 102, while the pivot pin 114 and the pin head 116 may be coupled to the bearing surface 112, for example, by threaded members, welding, press fit, or the like. Persons skilled in the art will appreciate that the hinge joints may be of various constructions without deviating from the spirit and/or scope of the present invention.

FIGS. 3A-3D are plan views of one implementation of a temple member 120 of the present invention. As shown in these figures, the temple member 120 includes an elongated arm 122, a temple tip 124 at one end of the arm 122, and a coupling member 126 at an opposite end of the arm 122. The temple member 120 may be constructed to any suitable thickness and may be made of plastic, metal, composite, or any other suitable material. In this particular implementation, the temple member is made of stainless steel. The temple members may be formed by machining, die casting, stamping, injection casting, and the like.

The arm 122 is adapted to extend rearwardly to the user's ear and has a formed tip 124 at its distal end. The temple tip 124 is configured to hook over the user's ear. The tip 124 may be constructed of a firm or soft material. Alternatively, the arm 122 and temple tip 124 may be partially or fully-covered by a thin-sleeve made of rubber, silicone, or other resilient material for user comfort.

The coupling member 126 is coupled to an opposite end of the arm 122. The coupling member 126 is configured to pivotally couple the temple members 120 to the hinge joint 110.

In an implementation of the invention shown in FIGS. 3A-3D and 4, the coupling member 126 may include a C-shaped clip 128 having a body 129. As shown in FIGS. 3A-3D), the body 129 of the clip may be integrally formed at an end of the arm 122. In other implementations, the body 129 of the clip may be secured to an end of the arm 122 by various means, such as, for example, a rivet, screw, by welding, or any other suitable means. Persons skilled in the art will appreciate that other types of coupling members 126 may be utilized.

The clip 128 includes a pair of curved clamping members 134 (FIG. 4) that extend outwardly from the body 129 of the clip. The clamping members 134 are configured to releasably secure the clip 128 to the pivot pin 114 (FIG. 2B). In an implementation of the invention, the clamping members 134 may constructed to a thickness complementary of the pivot pin height to provide a snug fit between the pin head 116 (FIG. 2B) and the bearing surface 112 (FIG. 2B).

Figure 4:
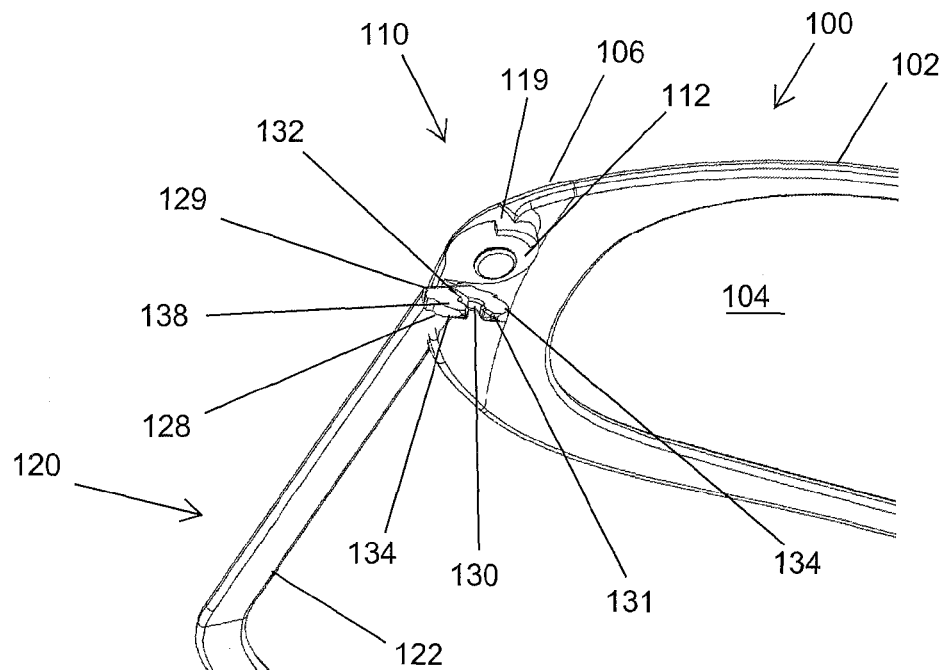
FIG. 4 is a perspective exploded view of the hinge joint of the eyeglasses of FIG. 1.

As better shown in FIG. 4, an aperture formed between the clamping members 134 defines a circular seat 130 for engaging the pivot pin 114 (FIG. 2B). The seat 130 opens towards a pair of converging surfaces 131 located at the front of the clamping member 134. The converging surfaces 131 may be filleted or chamfered at their leading edges to ensure a smooth engagement between the clip 138 and the pivot pin 114. A slot 132 extending from the seat 130 into the body 129 increases the resiliency of the clamping members 134 to enable the members to flex (i.e., move away from and towards one another) when the clamping members 134 are engaged with the pivot pin 114.

Turning back to FIGS. 3A-3D, the coupling member 126, arm 122, and temple tip 124 are coupled together in an angled configuration. As shown in FIG. 3A, the arm 122 may be oriented at an acute angle of, for example, 40° relative to the coupling member 126. Similarly, the temple tip 124 may be oriented at an acute angle of, for example, 17° relative to the arm 122. Persons skilled in the art will appreciate that the coupling member, arm, and temple tip may be coupled together at various angles and configurations without deviating from the spirit and/or scope of the present invention.

The temple members 120 may be coupled to the eyeglass frame 102 at the hinge joints 110. One example of coupling the temple member 120 to the hinge joint 110 may include applying force to engage the clamping members 134 with the pivot pin 114. As the pivot pin 114 is urged along the converging surfaces 131 towards the seat 130, the converging surfaces 131 flex the clamping members 134 away from one another until the pivot pin 114 is engaged by the seat 130. Once the pivot pin 114 is engaged by the seat 130, the mechanical load on the flexed clamping members 134 will urge the clamping members back toward one another to snap or friction fit the clamping members 134 about the pivot pin 114. The seat 130 may be dimensioned to provide an interference fit that secures the pivot pin 114 in place within the seat 130. Further, the pin head 116 may be configured to retain the clamping members 134 in the annual sleeve formed between the bearing surface and the pin head. In this way, the clip 128 is prevented from sliding off of the pivot pin 114.

Once coupled to the eyeglass frame 102, the temple members 120 may rotate about the pivot pin 114 between a first, open or extended position and a second, closed or folded position. To facilitate rotation of the temple members 120 relative to the eyeglass frame 102, a top surface 138 of the clip 128 may be smoothed or polished to complement the bearing surface 112 of the hinge joint 110, which enables the temple members to smoothly rotate between the open and closed positions. However, some degree of friction between the top surface 138 and the bearing surface 112 may be desired to retain the temple members 120 in the respective open and closed positions.

FIGS. 5A-5E illustrate how the temple members 120 pivotally fold between the open position and the closed position during use. In particular, when the eyeglasses 100 are worn, the temple members 120 may be maintained in an extended or open position, as shown in FIG. 1. In the open position, the temple members 120 may be maintained in substantially horizontal, parallel, and spaced apart relation. In the open position, the tips 124 of the temple members 120 are pointed downward to enable the tips 124 to hook around the user's ears when the eyeglasses 100 are worn by the user.

In one implementation of the invention, as best shown in FIG. 6, the temple members 120 are maintained in the open position by a first tab 140 carried by the clip 128 that engages a stop 119 extending from an upper perimeter of the bearing surface 112 of the hinge joint 110. The stop 119 prevents the clip 128, and ultimately the temple members 120 from over-rotating outwardly (clockwise and counterclockwise above substantially 180° and 0°, respectively). The stop 119 may be of annular construction and configured to permit the clamping members 134 to freely rotate within the stop 119. Persons skilled in the art will appreciate that the stop may be of various constructions.

Figure 5A:
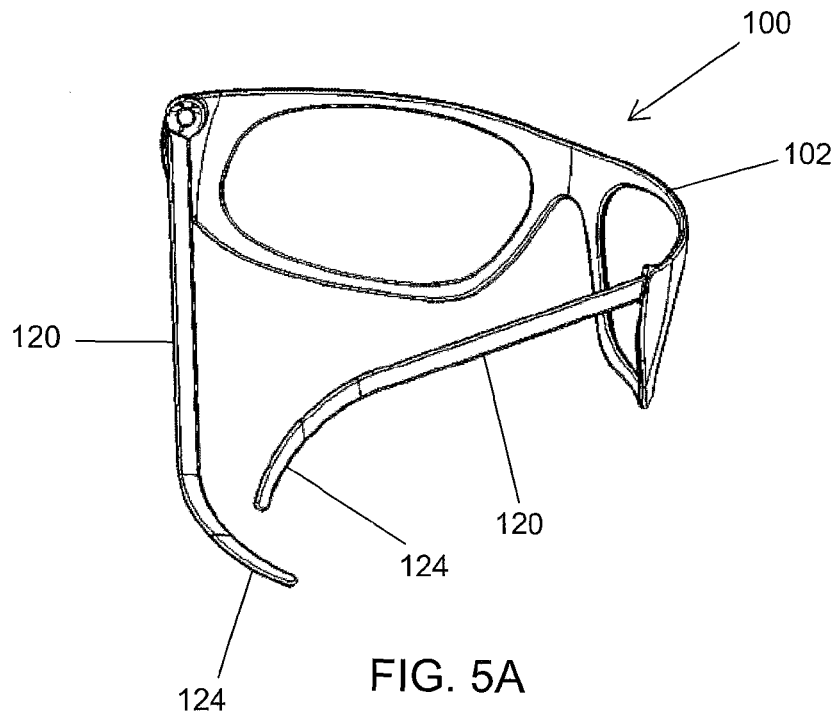

To stow or fold the eyeglasses, the user may rotate the temple members 120 inward relative to the eyeglass frame 102 such that one temple member 120 folds over the other temple member in the interior region 108. In the example shown in FIGS. 5A-5E, the temple members 120 may be rotated about axis 115 in a substantially vertical plane from the open position approximately one-hundred seventy degrees (170°) clockwise and counter clockwise, respectively, to the stowed or closed position within the interior 108. As the temple members 120 are rotated inward toward the interior region 108, one temple member 120 folds over the other, temple member 120 and the orientation of their respective temple tips 124 is inverted upwards, as illustrated in FIG. 5E.

In the closed position, as shown in FIG. 7, a second tab 142 carried by the clip 128 engages the stop 119 to prevent the clip 128, and ultimately the temple members 120 from over-rotating inwardly (clockwise and counterclockwise above substantially 170° and 350°, respectively). The angular construction of the temple members 120 enables the temple members to rest or be stowed proximal the lenses 104 of the eyeglasses 100 in interior 108.

Once stowed, the eyeglasses 100 may be placed in a protective casing for storage and protecting the lenses of the eyeglasses from damage. One eyeglass case is described in U.S. patent application Ser. No. 12/569,592, the disclosure of which is incorporated fully herein by reference, however, eyeglass cases with various configurations and dimensions may be used to store eyeglasses of the present invention. When the user desires to wear the eyeglasses 100, the eyeglasses 100 may be opened for use by rotating the temple members 120 outward about axis 115 from the stowed or closed position to the open position.

Figure 8:
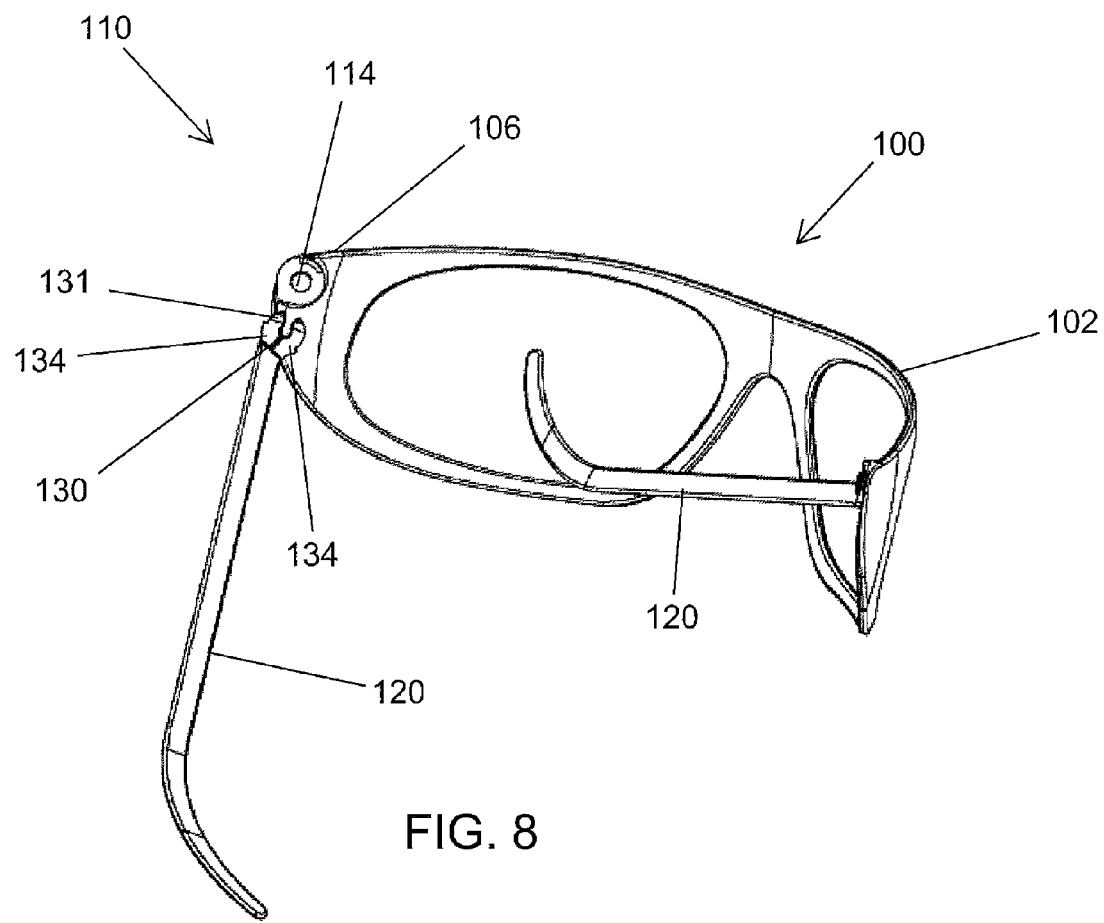
FIG. 8 is a rear perspective view of the eyeglasses of FIG. 1 illustrating a temple member detached from its corresponding hinge joint.

As an alternative to folding the temple members 120, the user may prefer to detach the temple members 120 from the eyeglass frame 102 for storage purposes. As shown in FIG. 8, the temple members 120 may be detached from the from the eyeglass frame 102 by applying force to the temple members 120 to disengage the clamping members 134 from the pivot pin 114. As the pivot pin 114 disengages the seat 130, the converging surfaces 131 will flex the clamping members 134 away from one another until the pivot pin 114 is disengaged from the seat 130. Once the pivot pin 114 is disengaged from the seat 130, the mechanical load on the flexed clamping members 134 will urge the clamping members back toward one another to their original configuration.

FIGS. 9-16 illustrate another example of a pair of eyeglasses 200 according to the present invention. In this example, the eyeglass frame 202 and temple members 220 may be constructed of plastic, for example cellulose acetate, and the pivot pin 214 may be constructed of metal. The eyeglass frame 202 may be a curved having a contour that defines an interior region 208 (FIG. 15) behind the eyeglass frame where the temple members 220 may be stowed in the closed position.

As shown in FIG. 9, the bearing surface 212 and the stop 219 may be plastic and integrally formed with the eyeglass frame 202 at its end pieces 206. The pivot pin 214 may be constructed of metal and coupled to the bearing surface 212 by, for example, a threaded member, adhesive, welding, press fit, or other suitable means.

Turning now to FIGS. 10A-10C, the arms 222 of the temple member 220 may be curved with the formed temple tip 224 at one end of the arm 222, and the coupling member 226 secured to the opposite end 225 of the arm 222. In this example, the opposite end 225 of the arm may include a cut-out 227 (FIG. 11) or may be otherwise configured to receive the body of 229 of the clip 228. Once imbedded into the cut-out 227, the coupling member may be seared to the opposite end 225 of the arm 222 by a press fit, snap lock, or other suitable means. In other implementations, the coupling member 226 may be permanently secured to the opposite end 225 of the arm by an adhesive, welding, overmolding, or other suitable means.

Similar to the implementation 100 described above, the coupling members 226 used in this implementation of the invention are configured to pivotally couple the temple members 220 to the hinge joints 210, thereby, enabling the temple members 220 to pivotally fold between the open position (FIG. 9) and the closed position (FIG. 12) during use.

Figure 11:
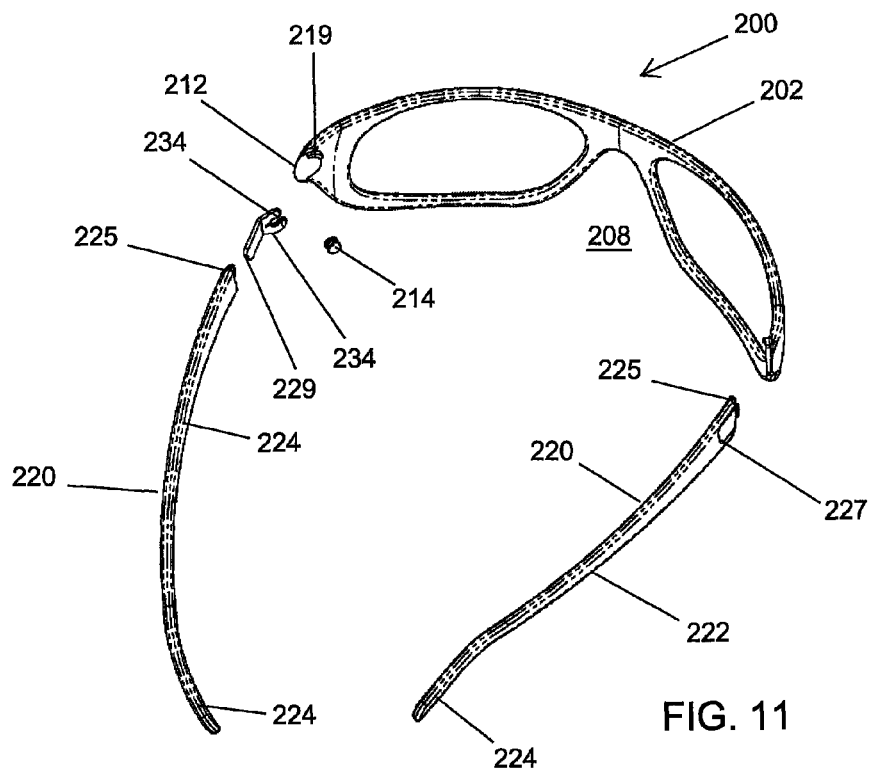
FIG. 11 is a perspective exploded view of the eyeglasses of FIG. 9.

As illustrated in FIG. 11, the clamping members 234 are adapted to releasably secure the clip 228 to the pivot pin 214 via a snap or friction fit. Once coupled to the hinge joints 210, the temple members 220 may rotate about the pivot pin 214 between the open (extended) position and the closed (folded) position. In this implementation, the metal-to-metal contact between the pivot pin 214 and the clamping members 234 enables the temple members 220 to smoothly rotate between the open and closed positions. However, some degree of friction between the coupling members 226 and the bearing surface 212 may be desired to retain the temple members 220 in the respective open and closed positions.

Figure 13:
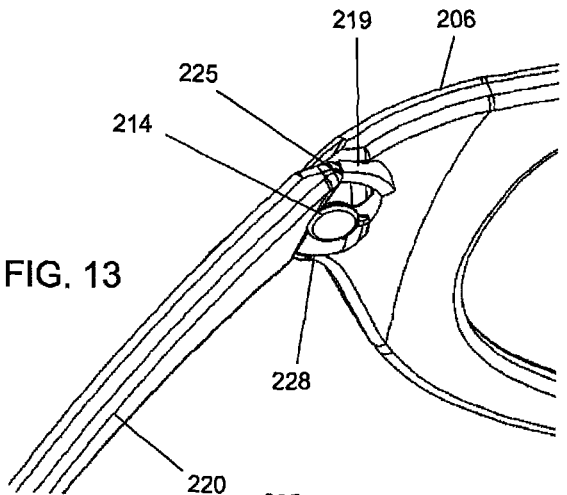
FIG. 13 is a perspective view of a hinge joint of, the eyeglasses of FIG. 9 illustrating the temple member in the open position.
Figure 14:
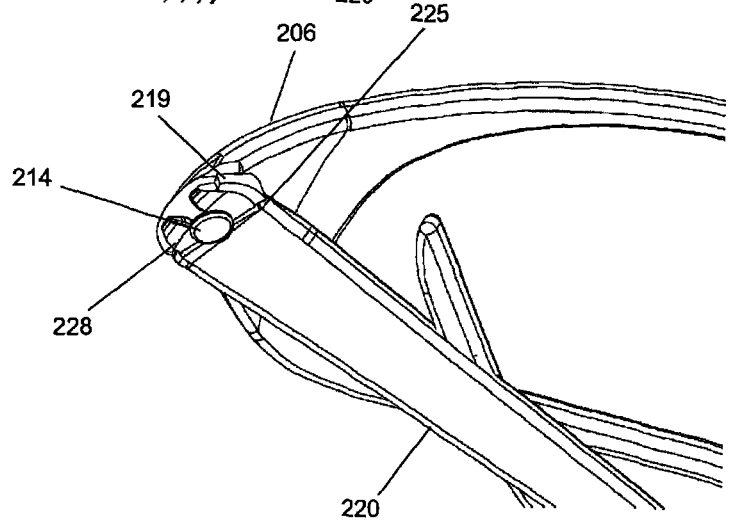
FIG. 14 is a perspective view of a hinge joint of the eyeglasses of FIG. 9 illustrating the temple member in the closed position.
Figure 15:
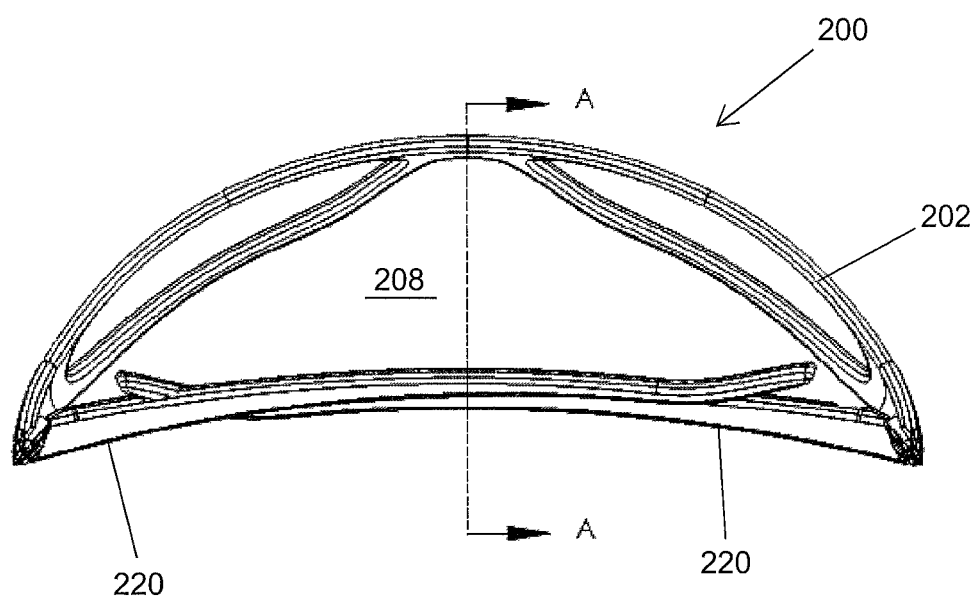
FIG. 15 is a top plan view of the eyeglasses of FIG. 9 illustrating the temple members in the closed position.
Figure 16:
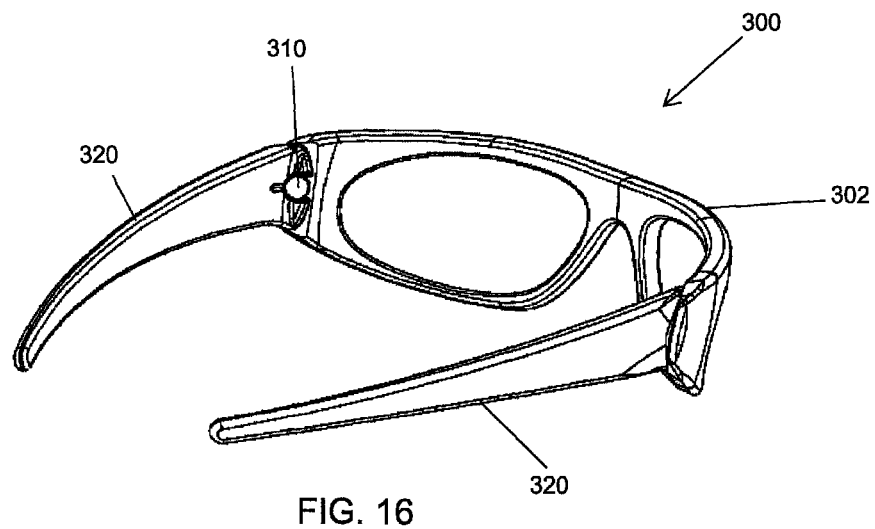
FIG. 16 is a rear perspective view of an additional example of an implementation of a pair of eyeglasses of the invention.
Figure 17:
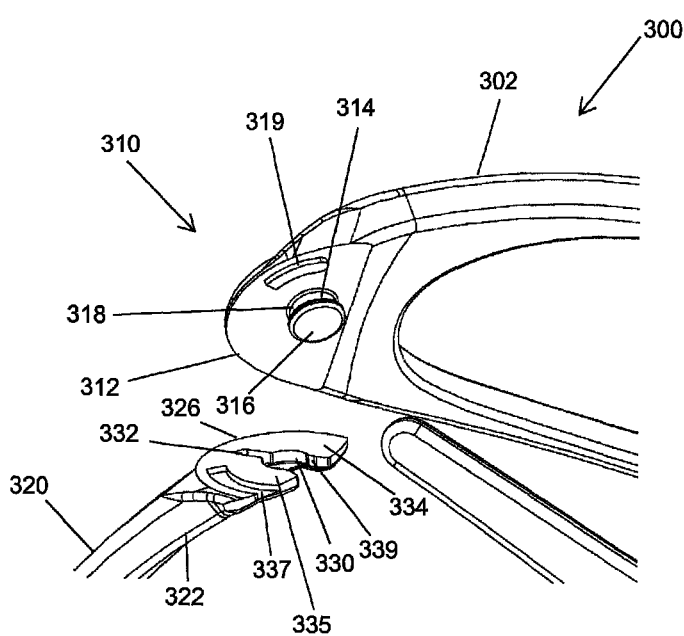
FIG. 17 is a perspective exploded view of the hinge joint of the eyeglasses of FIG. 16.
Figure 18:
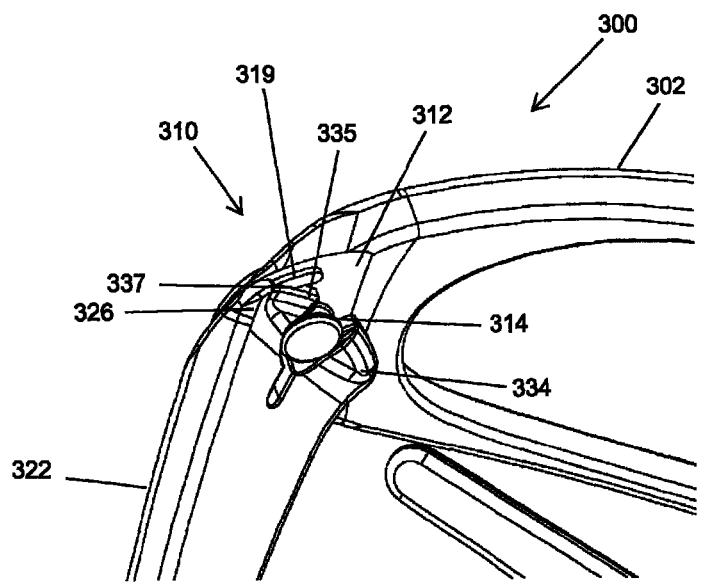
FIG. 18 is a perspective view of a hinge joint of the eyeglasses of FIG. 16 illustrating the stop engaging the circular channel in the coupling member.
Figure 19:
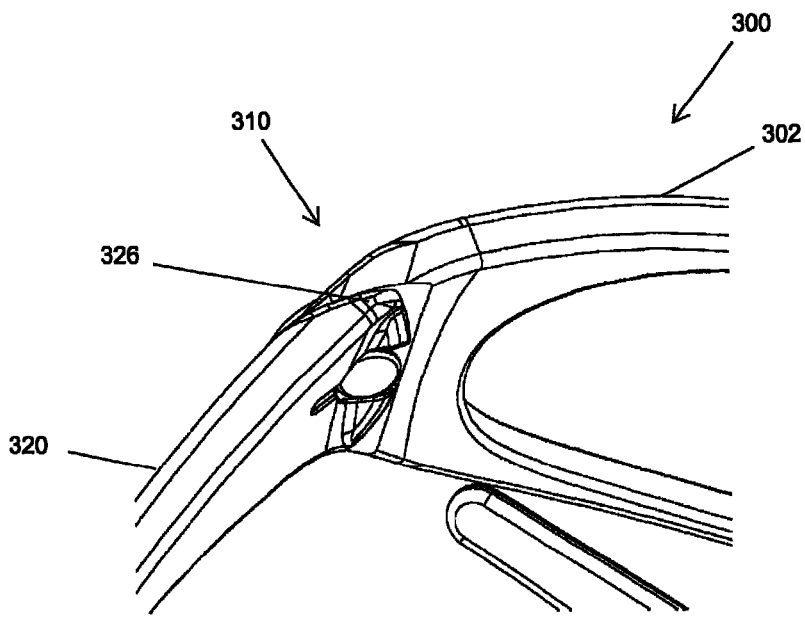
FIG. 19 is a perspective view of a hinge joint of the eyeglasses of FIG. 16 illustrating the temple member in the open position.

In the open position, as shown in FIG. 9, the temple members 220 may be maintained in substantially horizontal, parallel, and spaced apart relation. In the open position, the tips 224 of the temple members 220 are pointed downward to enable the tips 224 to hook around the user's ears when the eyeglasses 200 are worn by the user. As shown in FIG. 13, the temple members 220 are maintained in the open position by the stop 219 which engages the opposite end 225 of the temple members 220 to prevent the members from over-rotating outward.

Figure 12:
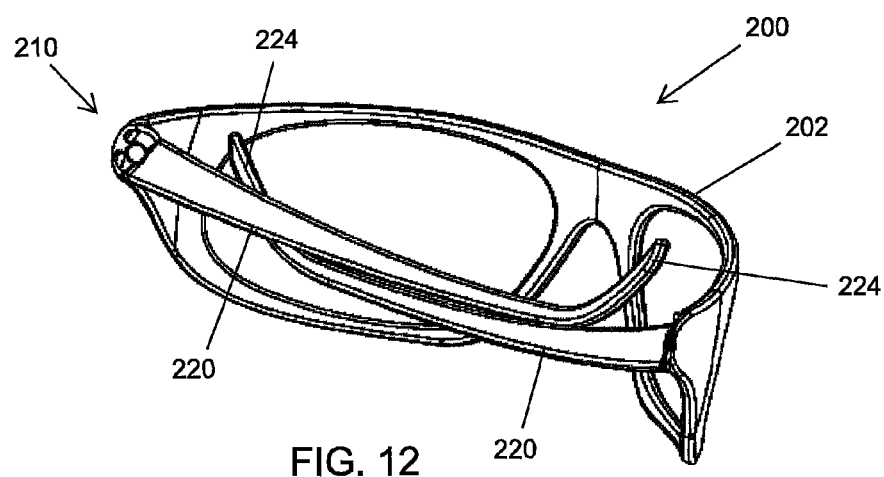
FIG. 12 is a rear perspective view of the eyeglasses of FIG. 9 illustrating the inward rotation of the temple members in the closed position.

In the closed position, as shown in FIG. 12, one temple member 220 folds over the other and the orientation of their respective temple tips 224 is inverted upwards. As better shown in FIG. 14, the temple members 220 are similarly maintained in the closed position by the stop 219 which engages the opposite end 225 of the temple members 220 to prevent the members from over-rotating inward.

In this example, the coupling member 226 and the temple tip 224 may be coupled together in an angled configuration. Referring back to FIG. 10A, the clamping members 234 may be oriented at an acute angle of, for example, 45° relative to the temple arms 222. The angled orientation of the temple members 220 enables the temple members to rest or be stowed in the interior region 208 proximal the lenses 204, in the closed position shown in FIG. 15.

As shown in FIG. 11, similar to the implementation described above, the temple members 220 may be detached from the eyeglass frame 202 by applying force to the temple members 220 to disengage the clamping members 234 from the pivot pin 214. As the temple members 220 are urged away from the pivot pin 214, the clamping members 234 will flex away from one another until the pivot pin 214 is disengaged from the seat formed between the clamping members 234. Once the pivot pin 214 is disengaged from the seat, the mechanical load on the flexed clamping members 234 will urge the clamping members back toward one another to their original configuration.

FIGS. 16-20 illustrate an example of a pair of eyeglasses 300 of the invention where the eyeglass frame 302 and the temple members 320 are all made from a thick plastic material. In this example, as better shown in FIG. 17, the coupling member 326 is integrally formed with an end of the arm 322. The coupling member 326 includes a first clamping member 334, a second clamping member 335, a circular seat 330 formed between the first and second clamping members 334, 335, and a pair of tabs 339 formed at distal ends of the clamping members 334, 335. The tabs 339 are configured to secure the coupling member 326 about the pivot pin 314 by a snap or interference fit (see, e.g., FIG. 18). The coupling member 326 also includes a slot 332 that extends from the seat 330 into the arm 332. The slot 332 increases the resiliency of the clamping members 334 to enable the members to flex as the clamping members 334 engage the pivot pin 314 during use.

In this example, while the temple members 320 fold and open similar to the implementations described above, the temple members 320 are maintained in the open position by a circular channel 337 etched into the second clamping member 335. In particular, the channel 337 is configured to receive a stop 319 formed along the top of the bearing surface 312 (see FIG. 18). In this example, the stop 319 is an elongated member having outer dimensions complementary to the dimensions of the channel 337. In the open position, as better shown in FIG. 19, the stop 319 (not shown) is fully engaged with the channel 337 (not shown) to prevent further outward rotation of the temple members 320.

Figure 20:
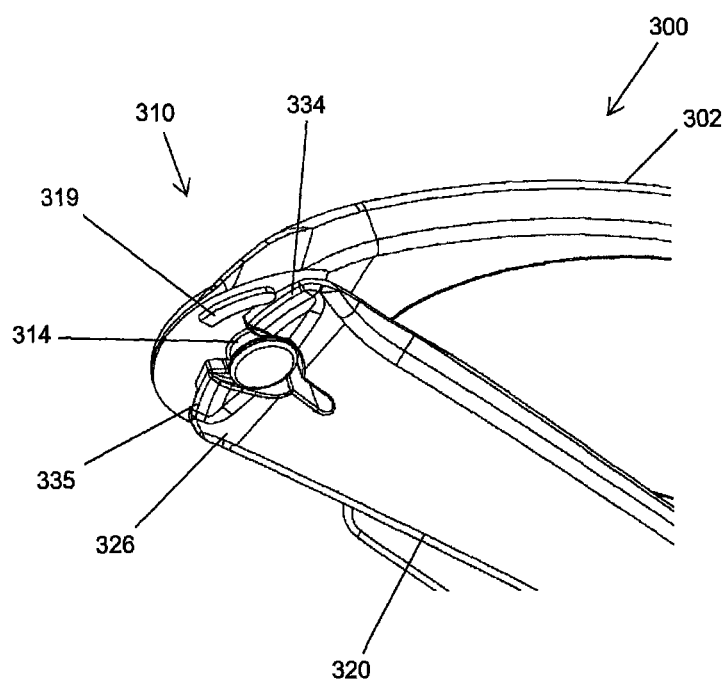
FIG. 20 is a top plan view of the eyeglasses of FIG. 16 illustrating the temple members in the closed position.

Alternatively, as better shown in FIG. 20, in the closed or folded position the stop 319 engages the first clamping member 334 to prevent further inward rotation of the temple members 320.

While implementations of the present invention are described herein as sunglasses, persons skilled in the art will appreciate that eyeglasses of the present invention can be of many different types (e.g., corrective or prescription, protective glasses, visual effects glasses, and the like), having different eyeglass frame and temple member geometries, and made of different materials. The eyeglasses may be custom made or sold in standard sizes for the more common glass sizes and shapes.

In general, terms such as "coupled to," and "configured for coupling to" and "secured to" (for example, a first component is "coupled to" or "is configured for coupling to" or is "secured to" a second component) are used herein to indicate a structural, functional, mechanical, electrical, signal, optical, magnetic, electromagnetic, ionic or fluidic relationship between two or more components or elements. As such, the fact that one component is said to couple to a second component is not intended to exclude the possibility that additional components may be present between, and/or operatively associated or engaged with, the first and second components.

The foregoing description has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

We claim:

1. A pair of eyeglasses comprising:
   a frame having pivots coupled to opposite ends of the frame; the pivots including a bearing surface coupled to an end of the frame, a pivot pin extending substantially perpendicular from the bearing surface, and a pin head coupled to the top of the pivot pin;
   a pair of temple members pivotally coupled to the pivots, each temple member having a coupling member that is detachable from and rotates about the pivot and that is pivotal between a first position and a second position about a substantially horizontal axis running central to the pivot pin which allow the temple member to pivotally rotate about the horizontal axis toward the inside of the frame; and
   where each temple member includes an elongated arm extending from the coupling member and where the coupling member is coupled to a proximal end of the arm in an angled configuration such that the arm is oriented at acute angle relative to the coupling member, and where the coupling member includes clamping members that are rotatably and detachably secured to the pivot pin by a snap fit.

2. The eyeglasses of claim 1 where the first position is an open or extended position wherein the temple members are maintained in substantially parallel and spaced apart relation from one another and the temple tips are pointed downward, and the second position is a closed or stowed position wherein one of the temple members is folded over the other in an area behind the frame and the temple tips are pointed upward.

3. The eyeglasses of claim 1 where the coupling member is integrally formed with the arm.

4. The eyeglasses of claim 1 where the coupling member is attached to the proximal end of the arm.

5. A hinge connector for eyeglasses comprising:
   a pivot pin coupled to an end of the eyeglass frame; and
   a clip pivotally and detachably connected to pivot pin and configured to rotate about a substantially horizontal axis running central to the pivot pin in a substantially vertical plane between a first position and a second position such that the clip pivotally rotates about the horizontal axis toward the inside of the frame.

6. The hinge connector of claim 5 where the pivot pin is coupled to and extends substantially perpendicular from a substantially vertical surface formed at an end of the frame, the pivot pin defining a horizontal axis of rotation.

7. The hinge connector of claim 5 where the clip includes clamping members for detachably securing the clip to the pivot pin and a pair of tabs for limiting the rotation of the clip about the axis of rotation between a first position and a second position, the tabs being configured to engage a stop coupled to the eyeglass frame to prevent the clip from rotating beyond the first and second positions.

8. The hinge connector of claim 5 where the clip is coupled to an end of a temple member and the temple member rotates about the pivot pin between an extended position and a closed position.

9. The hinge connector of claim 8 where the clip is attached to an end of the temple member.

10. The hinge connector of claim 8 where the clip is integrally formed with an end of the temple member.

11. The hinge connector of claim 5 where the clip is detachably secured to the pivot pin by a snap fit.

12. A temple member for eyeglasses comprising:
    an elongated body; and
    a clamping member coupled to an end of the body, the clamping member being detachable from and pivotally coupled to the eyeglasses such that the temple member rotates about a substantially horizontal axis between a first position and a second position such that the temple member pivotally rotate about the horizontal axis toward the inside of the frame.

13. The temple member of claim 12 where the eyeglasses include a frame having a curved contour and hinge joints coupled to opposite ends of the frame, the hinge joints include a pivot pin pivotally coupled to the clamping member.

14. The temple member of claim 13 where the clamping member comprises a clip detachably secured to the pivot pin by a snap fit.

15. The temple member of claim 14 where the temple member may be detached from the frame when the eyeglasses are not in use and re-attached to the frame during use.

16. The temple member of claim 12 where the temple member may be rotated between an extended position to a closed position near lenses of the eyeglasses in the area behind the frame defined by the contour of the eyeglasses.

17. The temple member of claim 12 where the clamping member and body are coupled in angled relation.

18. The temple member of claim 12 where the clamping member is attached to an end of the body.

19. The temple member of claim 12 where the clamping member is integrally formed with an end of the body.

* * * * *